United States Patent [19]
Dials

[11] Patent Number: 5,725,259
[45] Date of Patent: Mar. 10, 1998

[54] CONDUIT COUPLING

[76] Inventor: Carroll P. Dials, 1385 Kalmar Dr., Cincinnati, Ohio 45240

[21] Appl. No.: 769,667

[22] Filed: Dec. 19, 1996

[51] Int. Cl.$^6$ .................................................... F16L 19/02
[52] U.S. Cl. ........................................ 285/334.4; 285/354
[58] Field of Search ............................ 285/354, 224.4, 285/386, 389

[56] References Cited

U.S. PATENT DOCUMENTS

| | | | |
|---|---|---|---|
| 2,547,889 | 4/1951 | Richardson | 285/354 |
| 2,850,303 | 9/1958 | Bauer | 285/354 |
| 3,195,936 | 7/1965 | Conder | 285/354 |
| 4,665,876 | 5/1987 | Hasimoto | 285/354 |
| 4,802,695 | 2/1989 | Weinhold | 285/354 |
| 5,060,988 | 10/1991 | Williamson | 285/354 |
| 5,074,599 | 12/1991 | Wirbel | 285/354 |
| 5,242,199 | 9/1993 | Hann et al. | 285/354 |
| 5,308,122 | 5/1994 | Crawford et al. . | |

*Primary Examiner*—Eric K. Nicholson
*Attorney, Agent, or Firm*—R. William Graham

[57] ABSTRACT

A conduit coupling includes generally cylindrical female, internal and male pieces wherein the female piece has an inner tapered shoulder at an angle and the internal piece has a tapered collar formed at a complimentary angle to the angle for disposal adjacent to the shoulder and an end tapered at another angle and the male piece has a tapered end formed at an angle complimentary to the another angle for disposal adjacent the tapered end of the internal piece.

7 Claims, 1 Drawing Sheet

CONDUIT COUPLING

BACKGROUND OF THE INVENTION

1. Field of the Invention

The present invention relates to the field of couplings. More particularly, this invention is directed to a conduit coupling which is less susceptible to leakage and the like due to external forces, such as vibrational and pressure forces, for example.

2. Related Art

There are many types of couplings known to the art. In the field pertaining to couplings which are used under pressure and vibration, as exists in internal combustion engines and machine tool, industry, a three-piece coupling including a female piece, internal piece and male piece is commonly employed. The female piece includes a first end having a first open surface of a predetermined diameter and a second open surface of a predetermined diameter greater than the diameter of the first open surface and coaxial therewith and having a 90° shoulder surface portion defined therebetween and a second end having a threaded open surface therein coaxial with the first and second open surfaces and wherein the first and second open surfaces and threaded open surface define an axial opening through the female piece. The internal piece has a first end connectable to a conduit and having a predetermined outer diameter less than the first open surface to permit passage through the opening, an intermediate portion having an outer diameter greater than the diameter of the first open surface and having a 90° collar formed therebetween which abuts the 90° shoulder portion, and a second end having an inner surface tapered at a predetermined angle. The male piece has a first end having an outer threaded surface to be complimentarily received adjacent the threaded surface of the second end of the female piece and having an outer surface tapered to be complimentary received against the inner tapered second end of the internal piece and a second end having an outer surface portion configured to readily enable threading of the first end of the male piece to the second end of the female piece and a terminal portion connectable to a conduit.

The problem with such coupling is the tendency to yield or distort during use due to pressure, temperature and/or vibration. Under such conditions, the coupling tends to loosen when subjected to thermal or mechanical load cycles. Such distortion may tend to lock the coupling under high pressure, but causes leakage of the coupling when the pressure drops as the parts relax.

There is therefore a need to overcome the problems associated with present couplings of the type described. There is also a need to provide a conduit coupling which is relatively pressure resistant and maintains a stable connection under conditions of pressure, temperature and/or vibration.

BRIEF SUMMARY OF THE INVENTION

It is an object to improve couplings.

It is another object to improve conduit couplings used under high pressure and/or vibration.

Accordingly, the present invention includes a conduit coupling having a female piece, an internal piece and male piece. The female piece has a first end having a first open surface of a predetermined diameter and a second open surface of a predetermined diameter greater than the diameter of the first open surface and coaxial therewith and preferably having a tapered shoulder defined therebetween at an angle and a second end having a threaded open surface therein coaxial with the first and second open surfaces and wherein the first and second open surfaces and threaded open surface define an axial opening through the female piece. The internal piece has a first end connectable to a conduit and having a predetermined outer diameter less than the first open surface to permit passage through the opening, an intermediate portion having an outer diameter greater than the diameter of the first open surface and preferably having a tapered collar formed therebetween at an angle which is complimentary with the angle and disposable adjacent the shoulder, and a second end having an outer surface tapered at another angle. The male piece has a first end having an outer threaded surface to be complimentarily received adjacent the threaded surface of the second end of the female piece and an inner surface tapered at an angle complimentary with the another angle second end of the internal piece and a second end having an outer surface portion configured to readily enable threading of the first end of the male piece to the second end of the female piece and a terminal portion connectable to a conduit.

The present invention results in coupling having high normal force and corresponding friction load direction to resist loosening. The present invention also has an advantage that the load direction internal in the coupling and the pressure load increases the thread engagement. Also, the present invention also provides a coupling having increased resistance to pressure and/or vibration.

Other objects and advantages will be readily apparent to those skilled in the art upon viewing the drawings and reading the detailed description hereafter.

DETAILED DESCRIPTION OF THE INVENTION

Figure 1:
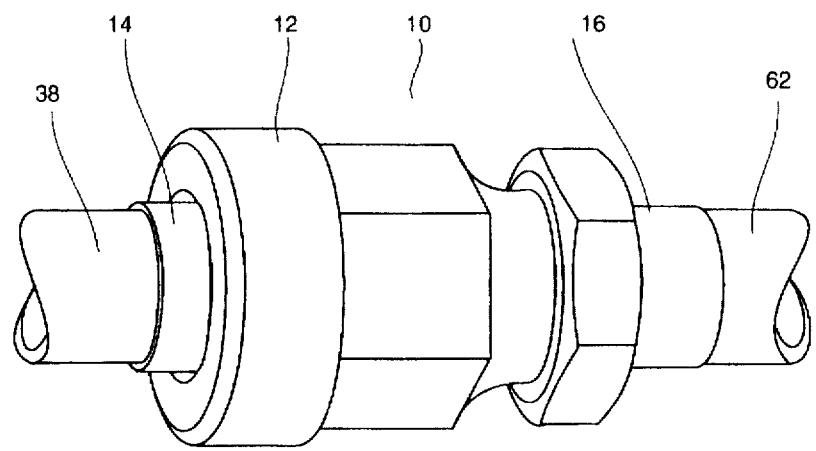
FIG. 1 is a perspective view of the present invention.
Figure 2:
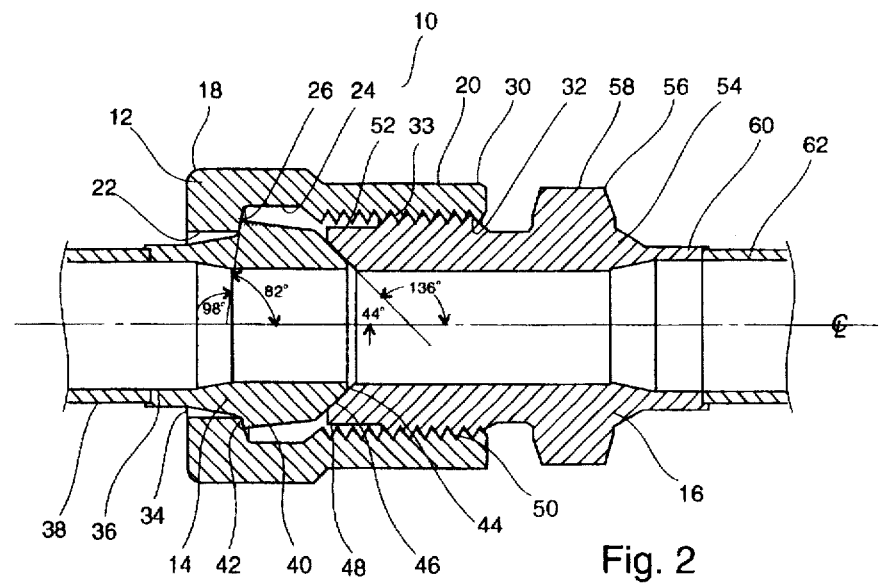
FIG. 2 is a side cross-sectional view of the present invention.
Figure 3:
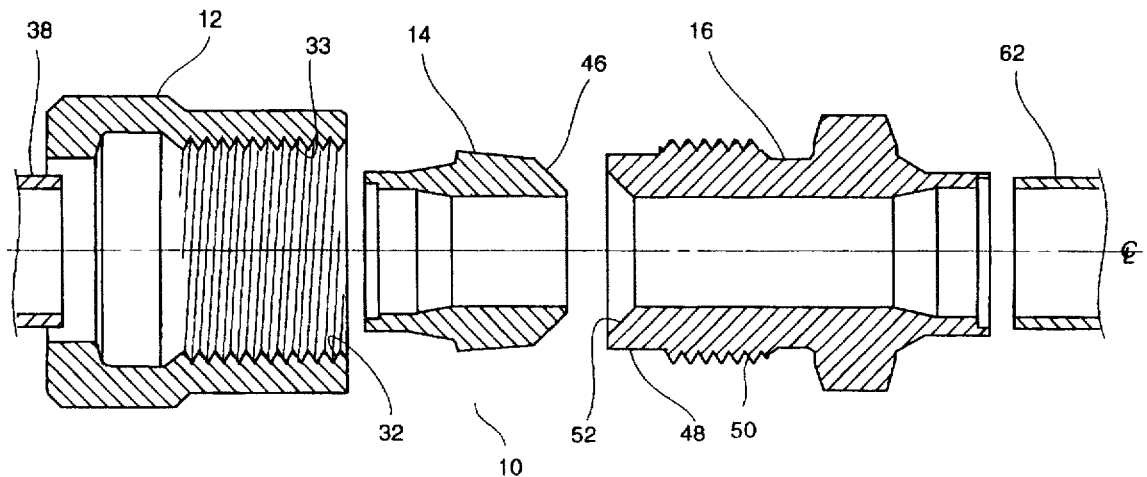
FIG. 3 is an exploded view of the present invention.

Referring now to the drawings, the conduit coupling of the present invention is generally designated with the numeral 10. The conduit coupling 10 includes a female piece or clamping nut 12, an internal piece or ferrule 14 and male piece 16.

The female piece 12 has a generally cylindrical body with first end 18 and a first inner open surface 22 of a predetermined diameter and a second inner open surface 24 of a predetermined diameter greater than the diameter of the first inner open surface 22 and coaxial therewith and having a tapered shoulder 26 defined therebetween. In this regard, the shoulder 26 is formed at approximately 98° from a centerline C. This 98° angle is determined by taking 180° less a first predetermined angle, wherein the predetermined angle substantially equates to 90° less a bearing friction angle formed between the shoulder and collar (due to friction between the two materials, here metal, for example, which yields an 8° friction angle.) Thus, we have 180°−(90°−8°) =98°. The female piece 12 has a second end 30 having six outer surface flats 20 and having a threaded inner open surface 32 therein coaxial with the first and second inner open surfaces 22 and 24 and wherein the first and second inner open surfaces 22 and 24 and threaded inner open surface 32 are in communication and define an axial opening 34 through the female piece 12. The inner threaded open surface 32 has bearing surface 33 formed at about 30° angle, i.e., this is the bearing surface angle.

The internal piece 14 has a generally cylindrical body and has a first end 36 connectable to a conduit 38 and having a predetermined outer diameter less than the first inner open surface 22 to permit passage through the opening 34. Also, included is an intermediate portion 40 having an outer diameter greater than the diameter of the first inner open surface 22 and forming a tapered collar 42 between the intermediate portion 40 and first end 36. The collar 42 is formed at approximately 82° (the first predetermined angle) from a centerline C to be complimentary with and abut in aligning fashion the shoulder 26. The effective compressive forces generated by the interface between the collar 42 and the shoulder 26 is a function of the angle of attack less the coefficient of friction between the parts, i.e., about 980°−8° or about 90° which is an axial load toward the compression of the internal piece which is very stiff and consequently less susceptible to bending.

The internal piece 14 has a second end 44 having an outer surface 46 tapered at an angle of about 44° with respect to centerline C. The angle of tapered surface 46 substantially equates to 90° less a bearing surface 33 angle of 30° less the bearing surface 33 friction angle of 8° (for metal to metal surface, for example) less the friction angle of 8° (for metal to metal surface, for example) between the tapered surfaces 46 and 52. Thus, 90°−30°−8°−8°=44°.

The male piece 16 has a generally cylindrical body and has a first end 48 having an outer threaded surface 50 which is complimentarily formed to the inner threaded surface 32 to be received adjacent thereto and an inner surface 52 tapered at about 136° angle with respect to centerline C to be complimentary received against the tapered outer surface 46. The friction angle between the parts is likewise 8°. The tapered surfaces 46 and 52 should be such finished in a manner to achieve an adequate sealing between the surfaces when positioned adjacent one another. Thus, the effective compressive forces generated by the interface between the tapered surfaces 46 and 52 is a function of the angle of attack less the coefficient of friction between the parts and the forces between the bearing surface 33 and threaded surface 50 is a function of the angle of attack less the coefficient of friction between the parts which substantially equal each other.

The male piece 16 also has a second end 54 having an outer surface portion 56 formed with six flats 58 configured to readily enable threading of the first end 48 of the male piece 16 to the second end 44 of the female piece 12 and also includes terminal portion 60 connectable to a conduit 62.

It is readily understood to the inventor that these angles can vary in accordance with the particular application, material selected, surface finish and surface lubrication, but the principles defined herein are to be utilized to accomplish the purposes of the present invention, e.g., that forces are compressive between threaded surfaces. Also, it is understood that the angles of the tapered surfaces as calculated above are intended to show an embodiment wherein the interacting forces are balanced. However, it is understood to be part of this invention that the forces may not in practice be exactly balanced, i.e., they may deviate several degrees due to design or tolerances and may still provide an adequate seal. Moreover, to achieve a better interlocking of the pieces without permanent deformation of the pieces, it may be desirable to slightly offset the forces and thus slightly shift the calculated angles by a few degrees.

By so providing the present invention, a novel and improved coupling for use in high pressure and/or vibrational environments is achieved. The coupling of the present invention seals from internal to external and maintains sealing and joint integrity under adverse conditions. Internal pressure in the present invention increases sealing by compressing the load as stored energy as opposed to other couplings which yield to dissipate the energy.

The above described embodiment is set forth by way of example and is not for the purpose of limiting the present invention. It will be readily apparent to those skilled in the art that obvious modifications, derivations and variations can be made to the embodiment without departing from the scope of the invention. Accordingly, the claims appended hereto should be read in their full scope including any such modifications, derivations and variations.

What is claimed is:

1. A conduit coupling, which includes:

a female piece having a first end having a first inner open surface of a predetermined diameter and a second inner open surface of a predetermined diameter greater than said diameter of said first inner open surface and coaxial therewith and having a shoulder defined therebetween and a second end having a threaded inner open surface therein coaxial with said first and second inner open surfaces and wherein said first and second inner open surfaces and threaded inner open surface are in communication with one another and define an axial opening through said female piece;

an internal piece having a first end connectable to a conduit and having a predetermined outer diameter less than said first inner open surface to permit passage through said opening, an intermediate portion having an outer diameter greater than said diameter of said first inner open surface and having a collar formed between said first end and said intermediate portion disposable adjacent said shoulder, and a second end having an outer surface tapered at a predetermined angle; and a male piece having a first end having an outer threaded surface to be complimentary received adjacent said inner threaded open surface of said second end of said female piece and having an inner tapered surface portion to be complimentary received adjacent said outer tapered surface of said second end of said internal piece and tapered at an angle of 180° less said predetermined angle, and a second end having an outer surface portion configured to readily enable threading of said first end of said male piece to said second end of said female piece and a terminal portion connectable to a conduit, wherein said predetermined angle substantially equates to 90° less a beating surface angle formed between said threaded surface of said second end of said female piece less a beating surface angle formed between said threaded surfaces less a friction angle formed between said inner and outer tapered surfaces.

2. The conduit coupling of claim 1, wherein said tapered surfaces are formed in a manner to effect an adequate seal when disposed adjacent one another.

3. The conduit coupling of claim 1, wherein said predetermined angle is further characterized to be within a range of about 42° to 46°.

4. The conduit coupling of claim 1, wherein said predetermined angle is further characterized to be 44°.

5. A conduit coupling, which includes:

a female piece having a first end having a first inner open surface of a predetermined diameter and a second inner open surface of a predetermined diameter greater than said diameter of said first inner open surface and coaxial therewith and having a tapered shoulder defined therebetween and tapered at an angle substantially of about 180° less a first predetermined angle and a second end having a threaded inner open surface therein coaxial with said first and second inner open surfaces and wherein said first and second inner open surfaces and threaded inner open surface are in communication with one another and define an axial opening through said female piece;

an internal piece having a first end connectable to a conduit and having a predetermined outer diameter less than said first inner open surface to permit passage through said opening, an intermediate portion having an outer diameter greater than said diameter of said first inner open surface and having a tapered collar formed therebetween at an angle substantially equal to said first predetermined angle disposable adjacent said shoulder, wherein said first predetermined angle substantially equates to 90° less a bearing friction angle formed between said shoulder and said collar and a second end having an outer surface tapered at a second predetermined angle; and a male piece having a first end having an outer threaded surface to be complimentary received adjacent said threaded inner open surface of said second end of said female piece and a terminal tapered portion to be complimentary received adjacent said outer tapered surface of said internal piece and tapered at an angle substantially of about 180° less a second predetermined angle and a second end having an outer surface portion configured to readily enable threading of said first end of said male piece to said second end of said female piece and a terminal portion connectable to a conduit, and wherein said second predetermined angle substantially equates to 90° less a bearing surface angle formed between said threaded surface of said second end of said female piece less a bearing surface angle formed between said threaded surfaces less a friction angle formed between said inner and outer tapered surfaces.

6. The conduit coupling of claim 5, wherein said tapered surfaces between said internal piece and said male piece are formed in a manner to effect an adequate seal when disposed adjacent one another.

7. The conduit coupling of claim 5, wherein said first predetermined angle is further characterized to be about 82° and said second predetermined angle is further characterized to be about 44°.

* * * * *